(12) United States Patent
Westphal (10) Patent No.: US 10,147,127 B2
(45) Date of Patent: Dec. 4, 2018

(54) SYSTEMS AND METHODS FOR PROVIDING AUTOMATED CUSTOMER ORDER CROSS REFERENCING

(71) Applicant: W.W. Grainger, Inc., Lake Forest, IL (US)

(72) Inventor: Geoffry A. Westphal, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 130 days.

(21) Appl. No.: 15/205,061

(22) Filed: Jul. 8, 2016

(65) Prior Publication Data

US 2016/0321729 A1    Nov. 3, 2016

Related U.S. Application Data

(63) Continuation of application No. 13/828,699, filed on Mar. 14, 2013, which is a continuation-in-part of application No. 13/693,676, filed on Dec. 4, 2012, now abandoned.

(51) Int. Cl.
| | |
|---|---|
| *G06Q 10/00* | (2012.01) |
| *G06Q 30/06* | (2012.01) |
| *G06Q 10/08* | (2012.01) |

(52) U.S. Cl.
CPC ......... *G06Q 30/0625* (2013.01); *G06Q 10/08* (2013.01); *G06Q 10/087* (2013.01); *G06Q 30/0603* (2013.01); *G06Q 30/0635* (2013.01)

(58) Field of Classification Search
CPC ........................... G06Q 20/127; G06Q 20/145
USPC ............................................... 705/28, 29, 30
See application file for complete search history.

(56) References Cited

U.S. PATENT DOCUMENTS

| | | | | |
|---|---|---|---|---|
| 6,055,516 A * | 4/2000 | Johnson | ............... | G06Q 10/087 701/1 |
| 2007/0185775 A1* | 8/2007 | Lawton | .................. | G06Q 30/06 705/80 |
| 2011/0173028 A1* | 7/2011 | Bond | ..................... | G06Q 10/08 705/3 |
| 2013/0179307 A1* | 7/2013 | Heil | ..................... | G06Q 10/087 705/27.1 |

* cited by examiner

Primary Examiner — Rokib Masud
(74) Attorney, Agent, or Firm — Greenberg Traurig, LLP (57) ABSTRACT

An auto cross-referencing functionality related to an order number directed to a product within an electronic catalog hosted by a vendor system is presented on a client computing device in a page providing an access point for ordering an item. The system allows a customer to enter a manufacturer, competitor, or other non-vendor specific ordering number into an ordering system and have the provided number transformed in-situ to the vendor's ordering number, either in real-time and/or through a batch-like process.

15 Claims, 11 Drawing Sheets

*[Figure 2: Screenshot of a Grainger Bulk Order Pad web interface showing product categories on the left, a bulk order entry form with Qty and Grainger Item # fields (item "ABC123" entered in first row marked 202a, with 202 and 202b callouts), and a Copy & Paste dialog (203) with text area (203a) for pasting item data. Cursor label points to the dialog area.]*

SYSTEMS AND METHODS FOR PROVIDING AUTOMATED CUSTOMER ORDER CROSS REFERENCING

CROSS REFERENCE TO RELATED APPLICATION

This application is a continuation of U.S. patent application Ser. No. 13/828,699, filed on Mar. 14, 2013, which application is a continuation-in-part of U.S. patent application Ser. No. 13/693,676, filed on Dec. 4, 2012, the contents of which are incorporated herein by reference in their entirety.

FIELD OF THE DISCLOSURE

The present description relates generally to cross referencing a secondary item number, such as a manufacturer model number to a vendor item number and more particularly to systems and methods for providing customer order cross referencing.

BACKGROUND OF RELATED ART

Currently, commerce suppliers and/or e-commerce related websites, whether business to business (B2B) or business to consumer (B2C), provide methods for a customer to navigate inventory. In particular, it is quite common for a large supplier or vendor, selling items from many different manufacturers and/or distributors, to provide a unique vendor item number (e.g., a catalog number, ordering number, inventory number, StockKeeping Unit (SKU), etc.) that corresponds to an item in the vendor's inventory system, and not necessarily to the manufacturer's or secondary item number.

In such instances where the vendor item number does not match the manufacturer's number, cross reference functionality typically exists as part of the general keyword search functionality of the vendor website. In these instances, the vendor website typically requires a customer to enter the part number, manufacturer's model number, etc., in a search field, to receive search results in a search page, and to peruse the results to finally select the desired product to research and/or add to the customers shopping cart. This searching capability, while sometimes sufficient for finding the correct vendor catalog number, oftentimes yields an inconsistent customer experience by, for example, making it difficult for the customer to quickly find and select the correct product easily and/or conveniently within the ordering process itself.

Still further, in other instances a substantial number of orders on the vendor's website can originate from website functionality such as a "bulk order pad" or interactive shopping cart. In this instance, a form that contains a table of entry fields, such as for example, a field for the vendor's ordering number and its associated ordering quantity. In this manner, orders can be quickly placed, provided the customer has the vendor ordering number handy. Unfortunately, having a vendor's ordering number on hand may not always be feasible, requiring a separate customer look-up step as detailed above.

Thus, while the background systems and methods identified herein, generally work for their intended purpose, the subject invention provides improvements thereto, particularly by a system in which a customer can enter a manufacturer, competitor, or other non-vendor specific ordering number into a bulk ordering system and have those numbers transformed in-situ to the vendor's item number, either in real-time, near real-time, and/or through a batch-like process.

BRIEF DESCRIPTION OF THE DRAWINGS

For a better understanding of the present disclosure, reference may be had to various examples shown in the attached drawings.

DETAILED DESCRIPTION

The following description of example methods and apparatus is not intended to limit the scope of the description to the precise form or forms detailed herein. Instead the following description is intended to be illustrative so that others may follow its teachings.

Systems and methods for providing cross referencing of a secondary item number, such as a manufacturer model number, to a vendor catalog or item number are described herein. In general, the example methods and systems provide the customer with the ability to enter a vendor catalog number and/or a manufacturer model number, and confirm the item order, all in a single user interface, thereby adding an item to the customer's purchase order. While the present disclosure commonly refers to an "ordering system," it will be understood that the ordering system may be any order and/or item entry, look-up, search, or order system as is well known in the art. Furthermore, the ordering system does not necessarily mean that the user must be placing an actual order at the time of usage, but rather may be discovering and/or search for an item as well.

As generally known, the distribution of a cross reference database illustrates that a substantial number of vendor catalog numbers cross reference (e.g. map) to only one, two, or three other model numbers. For example, a manufacturer model number XYZ123 may map to exactly one vendor item number. There are many of these one-to-one mappings in a typical vendor database. There are also a substantial number of cases where there is a one-to-two or a one-to-many mapping relationship. That is, a manufacturer model number may map to two, three, or multiple different vendor item numbers. For instance, manufacturer A might have a model number ABC123 that maps to a vendor's item number 1A123 (e.g., an amber barricade lamp), while manufacturer B might have the same model number, ABC123, that maps to vendor's item number 4WT09 (e.g., AA batteries).

The disclosed systems and methods provide for a simplified user interface to assist a customer in finding and/or selecting the correct vendor item number. For example, in a one-to-one mapping scenario, a customer may select or otherwise place their cursor into a user interface having an ordering number input field on a bulk order pad or other suitable order field, and enter ABC123, a manufacturer's model number. As the customer takes focus off the input field, such as by way of example, by selecting or placing the cursor in the corresponding quantity input field, an automated cross reference function may execute and recognize the one-to-one cross reference mapping and replace the originally entered ABC123 with the vendor's ordering number of 1A123. In at least one example of the present disclosure, if after transformation the cross reference is determined to be incorrect, the customer can indicate so by clicking on an "incorrect", "undo", "lookup", and/or other suitable button in the confirmation product information area to remove and/or investigate the entry. Clicking on a "select" or similar button keeps and accepts the transformation.

Similarly, where there is a one-to-many mapping scenario, an example customer may select and/or otherwise place their cursor into an ordering number input field and enter a manufacturer's model number such as XYZ123. Upon entering the manufacturer's number, the example system may perform a lookup to return a listing and/or display of the possible matches corresponding to the entered information. The customer, already knowing what they want to order but not knowing the vendor's item number, can select the correct vendor item they wish to order from the information provided.

It will be appreciated by one of ordinary skill in the art that there are numerous interface conventions to allow a customer to pick one of the matches. For example, each of the matches may be displayed in a pop-up, which may display a product image and/or product information for each matched product, either singularly or separately. Once presented to the user the customer may be provided with the opportunity to "select" and/or otherwise choose the correct product, such as for example, through the use of radio buttons.

In still further examples, a bulk listing, such as a copy-and-paste listing, can be utilized to create a delimited list of item numbers and corresponding ordering quantities, such as by way of example, by copying from a customer's computing device a prepared list and pasting the list into an input box on the vendors site, the vendor's site being a traditional server or even a mobile application. In this instance, in batch, real-time, and/or near real-time, the entire list of entered products can be redisplayed with choice buttons being displayed where there is more than one match corresponding to each original input ordering number. In this example, the traditional keyword search function and perusal of associated search results may be avoided altogether, and as such the process of placing orders may be quicker for customers for a large number of their orders.

In still other examples, it will be appreciated that other input methods are possible, such as voice, barcode, QR code scanning, etc. Moreover, it will be understood that additional query logic may enhance the cross referencing logic as desired. For example, a manufacturer's model number might include leading zeroes that may be dropped upon entering the model number into the ordering location. In this instance, if an initial cross reference attempt yields a null result, the search may be repeated by adding at least one leading zero (or other character as desired) to attempt to yield a matching product. It will be further appreciated that the database search may include additional logic to include close, relevant, related, and/or suggested search results to provide a greater likelihood of finding the cross referenced product.

Figure 1:
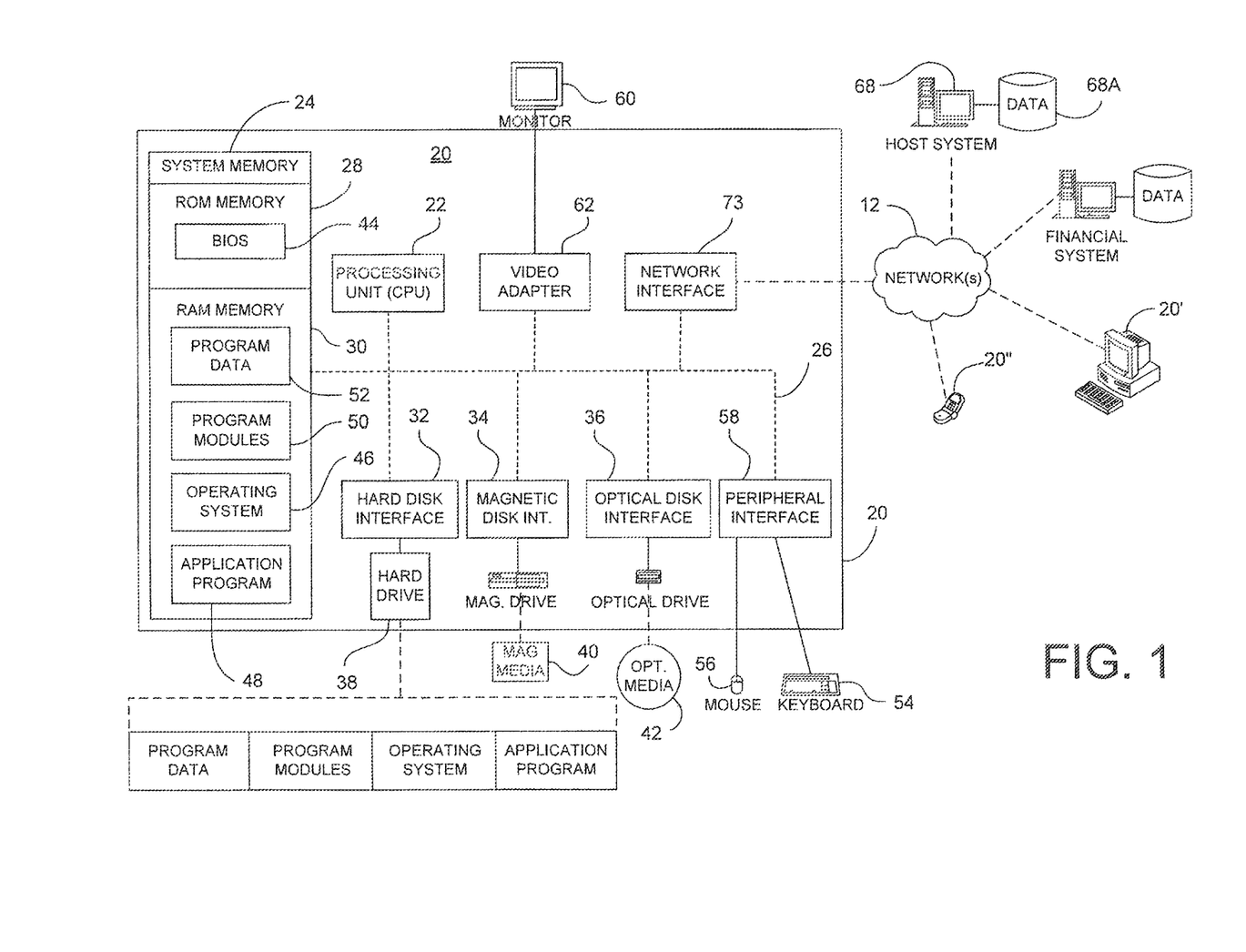
FIG. 1 illustrates in block diagram form components of an example, computer network environment suitable for implementing example cross referencing systems disclosed.

With reference to the figures, and more particularly, with reference to FIG. 1, the following discloses various example systems and methods for providing cross referencing on a computer network, such as a personal computer or mobile device. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a customer, e.g., a user, client, corporate shopper, buyer, consumer, etc., to access a host system server 68 and, among other things, be connected to a hosted vendor purchasing system, e.g., a website, mobile application, etc. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, a mainframe computer, a personal-digital assistant ("PDA"), a cellular telephone, a mobile device, a tablet, an ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules, and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. The example data repository 68A may include any suitable vendor data including, for example, customer/company information, electronic catalog pages, inventor, etc. In this example, the data repository G8A includes a listing of a plurality of products that are available for purchase. Each of the products includes a vendor item number, and may include an associated secondary item number or description, such as a manufacturer's model number, a keyword description, barcode, etc. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, facilitating the ordering of a vendor product, facilitating a cross reference of inventory numbers, facilitating recommendations, providing access to merchandise purchasing, etc.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

As noted above, in the present example, a customer generally interacts with the host system server 68 to order/purchase goods of interest. To facilitate this process, the host system server 68 provides access to various product ordering input methods, including, for example, a single item input, a bulk ordering pad, and/or a list importation method that is made conveniently accessible on a page, such as a mobile application page, webpage, etc. displayed on the client computing device. More particularly, as illustrated in the example page, i.e. a webpage 200 of FIG. 2, the host system server 68 provides in direct association with an inventory maintained in the data repository 68A, an access point 202, 203 presented in the form of a user interface (graphical user interface, web-based user interface, touchscreen user interface, etc), such as at least one text box, by which the customer may enter an item identifying number and/or an associated order quantity.

Figure 2:
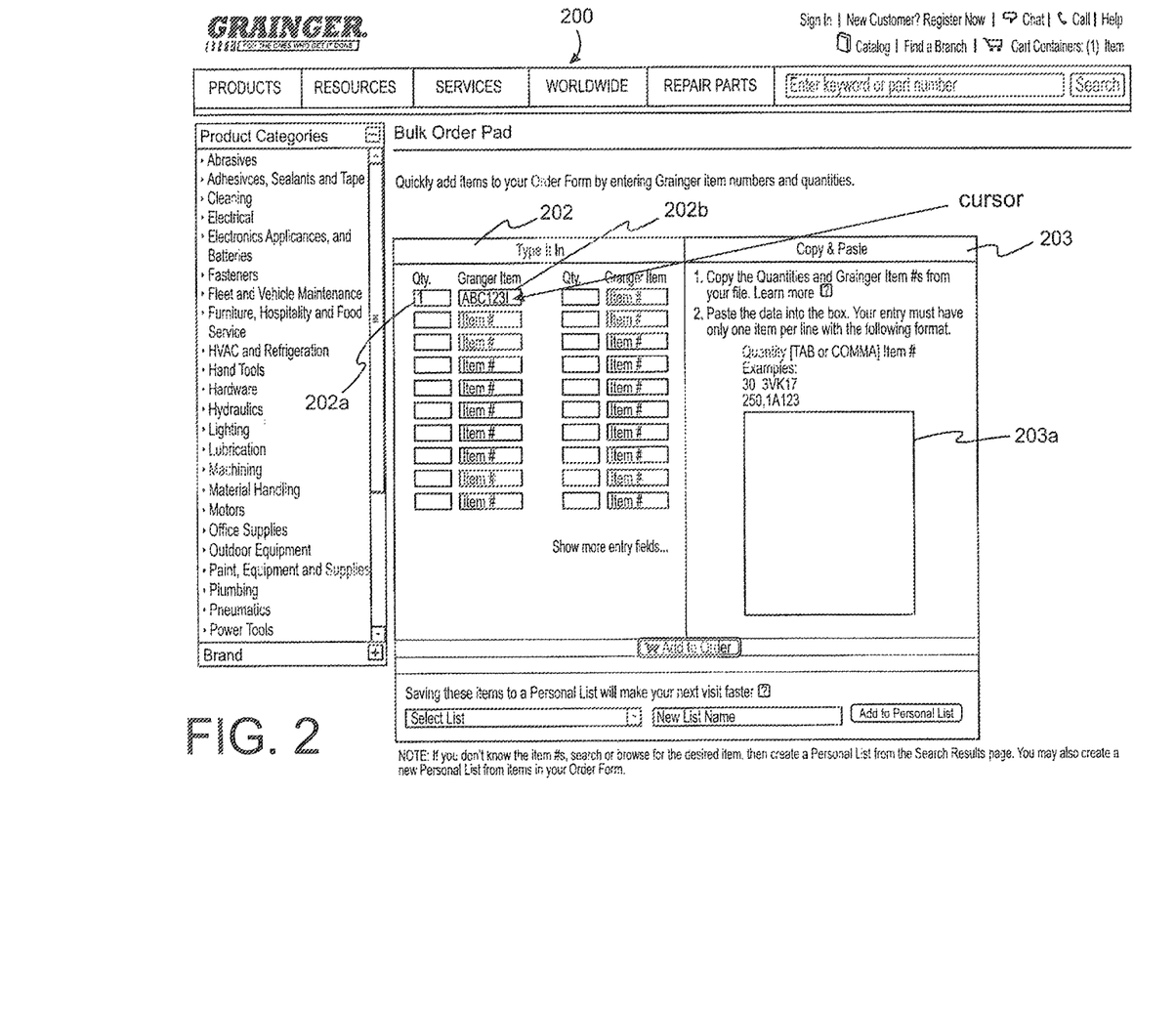
FIG. 2 illustrates an example page that provides an access point in which a customer can enter a manufacturer, competitor, or other non-vendor specific ordering number into an ordering system.
Figure 3:
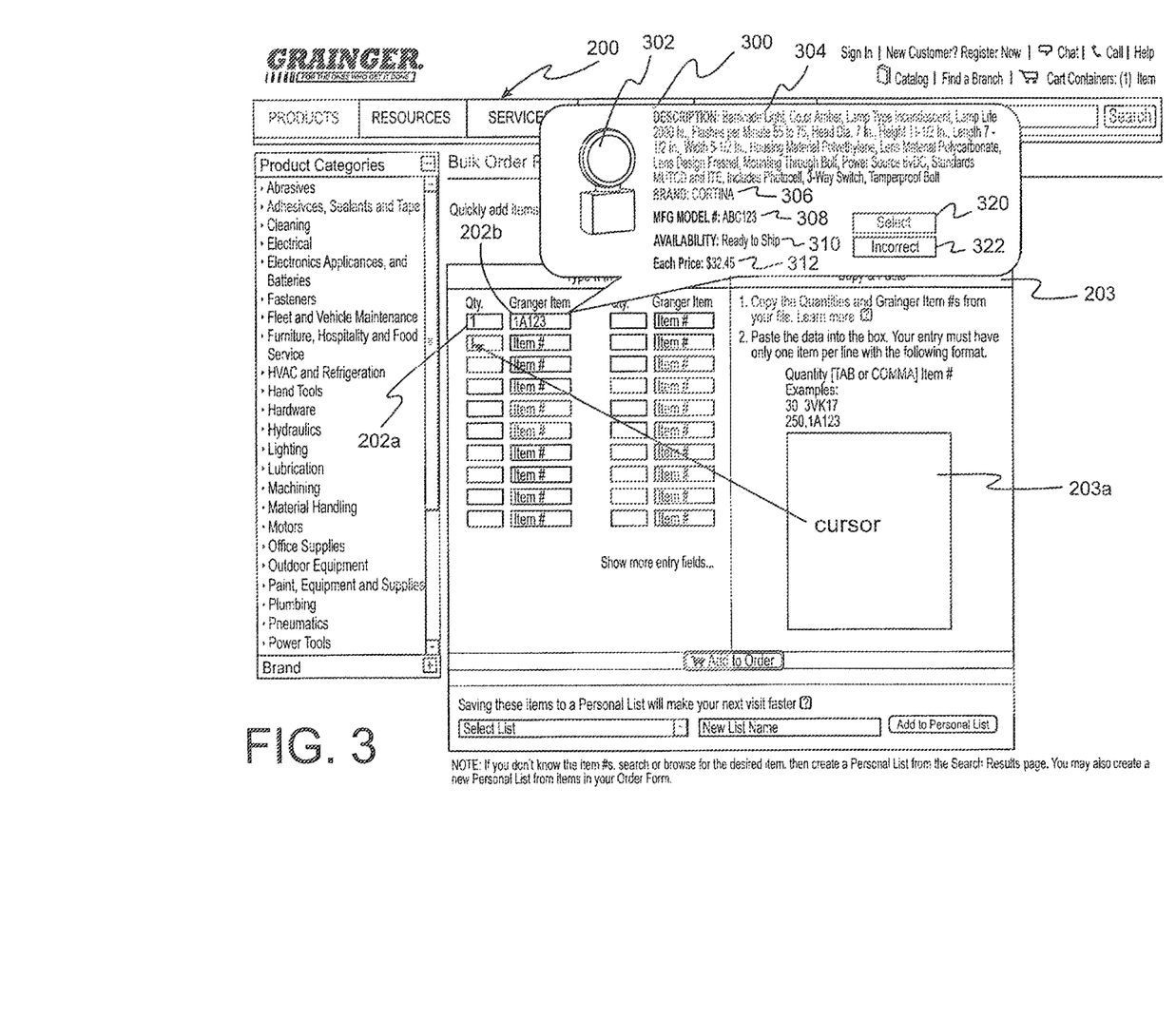
FIG. 3 illustrates the example page of FIG. 2 showing the results of data look-up to cross reference the provided ordering number against a product database of the ordering system.

In the illustrated example of FIGS. 2-3, the access point 202 comprises a plurality of separate text boxes 202a, 202b, each corresponding to one of an order quantity (202a) or an order item number (202b). Meanwhile the example access point 203 comprises a single input text box 203a that allows for a single bulk entry of parseable text. In this instance, each access point 202, 203 provides an entry method by which a customer may input order information, including item number and item quantity, to conveniently purchase goods from the vendor. It will be appreciated that the form, location, etc., of the access point 202, 203 may be displayed and/or vary as desired by design, and/or by display type (e.g., mobile device, personal computer, tablet, etc.). Still further, the type and/or manner of inputting the order information may be any suitable entry method including text, voice, picture, scanner, motion, etc.

In the present example, a customer enters any suitable item number known to the customer in the corresponding access point 202b or 203a to initiate a purchase process. For instance, referring to the example of FIG. 3, there is illustrated an example of a customer entering an item number such as item number "1A123" into the access point 202b. By entering the item number information into the access point 202b, the system host server 68 causes a look-up of the item number in the data repository 68A. It will be appreciated that the triggering event to perform the look-up of the item number in the data repository 68A may be caused by any suitable action, including for example, a change in the user interface focus, an activation of the access point by being clicked on, moused over, touched, and/or otherwise selected, a time delay, a real-time look-up, near real-time look-up, and/or any other suitable event trigger.

Upon the server 68 performing an item number look-up in the data repository 68A, the server 68 returns all matched and/or closely related search results to the window 200. For instance, in the example of FIG. 3, the server 68 performs a look-up on the item code "ABC123" and returns an item match on the vendor item number "1A123", a barricade light. As previously described, in the instance where the inputted item number corresponds directly to a vendor item number in the vendor catalog, the entered item number remains unchanged.

If, however, the system 68 determines that the entered item number needs to be cross referenced to a vendor item number stored in the data repository 68A, the system 68 causes the window 200 to display the returned results to the customer in various user interface elements such as a dialog box, in the form of a pop-up window 300, or any other suitable user interface element display. In the present example, the window 300 provides the customer with identifying information to assist the customer in identifying the desired item cross referenced against the vendor item numbers. For instance, in the example window 300, the customer is provided with an image 302, a description 304, a brand identifier 306, a manufacturer item number 308, an availability indicator 310, and a unit price 312. It will be appreciated that the information provided to the customer may be any suitable identifying information including, for instance, a catalog page, a membership reward, a vendor item number, a discount, a manual, etc. Still further, the provided information may include links, pages, and/or other methods of providing additional information regarding the product as desired, such as a browse and/or other "look-up" button, a further pop-up, etc. In at least one example, the additional information causes the system 68 to redirect to a further page, including a page located within the vendor system 68 and/or a further page located within a system of a third party (e.g. another manufacturer).

To allow the customer to select and/or otherwise confirm or identify the intended product, the example window 300 includes a selectable button or other means of indicating the correct or incorrect identification of the intended product (e.g., a check box, radio button, list box, drop down list box, etc.). Specifically, in the illustrated example, the window 300 includes a confirmation button 320 (e.g., "Select") and a cancel button 322 (e.g., "Incorrect"). In this example, by choosing the confirmation button 320, the customer can indicate that the retrieved and displayed item is the correct intended item, and allow the system 68 to replace the inputted item number with the correctly retrieved vendor item number in the access point 202b. By choosing the cancel button 322, however, the customer can indicate that the retrieved and displayed product is incorrect upon which the page may allow the inputted item number to be edited by the customer, allow the customer to browse or otherwise identify the product through the original website, and/or initiate a separate look-up identification process.

In the illustrated example of FIGS. 4-5, a customer again may enter any suitable item number known to the customer in the corresponding access point 202b to initiate a purchase process. For instance, in this example, the customer enters an item number such as item number "XYZ123" into the access point 202b, wherein the entered item number cross references to multiple vendor item numbers stored in the data repository 68A. Specifically, in this occasion, the system host server 68 causes a look-up of the entered item number in the data repository 68A, and returns multiple (e.g., two) matched and/or closely related search results to the window 200. Again, the system 68 causes the window 200 to display the returned results to the customer in a dialog box, such as for example two separate pop-up windows 500 and 502, each corresponding to one of the returned items.

Figure 4:
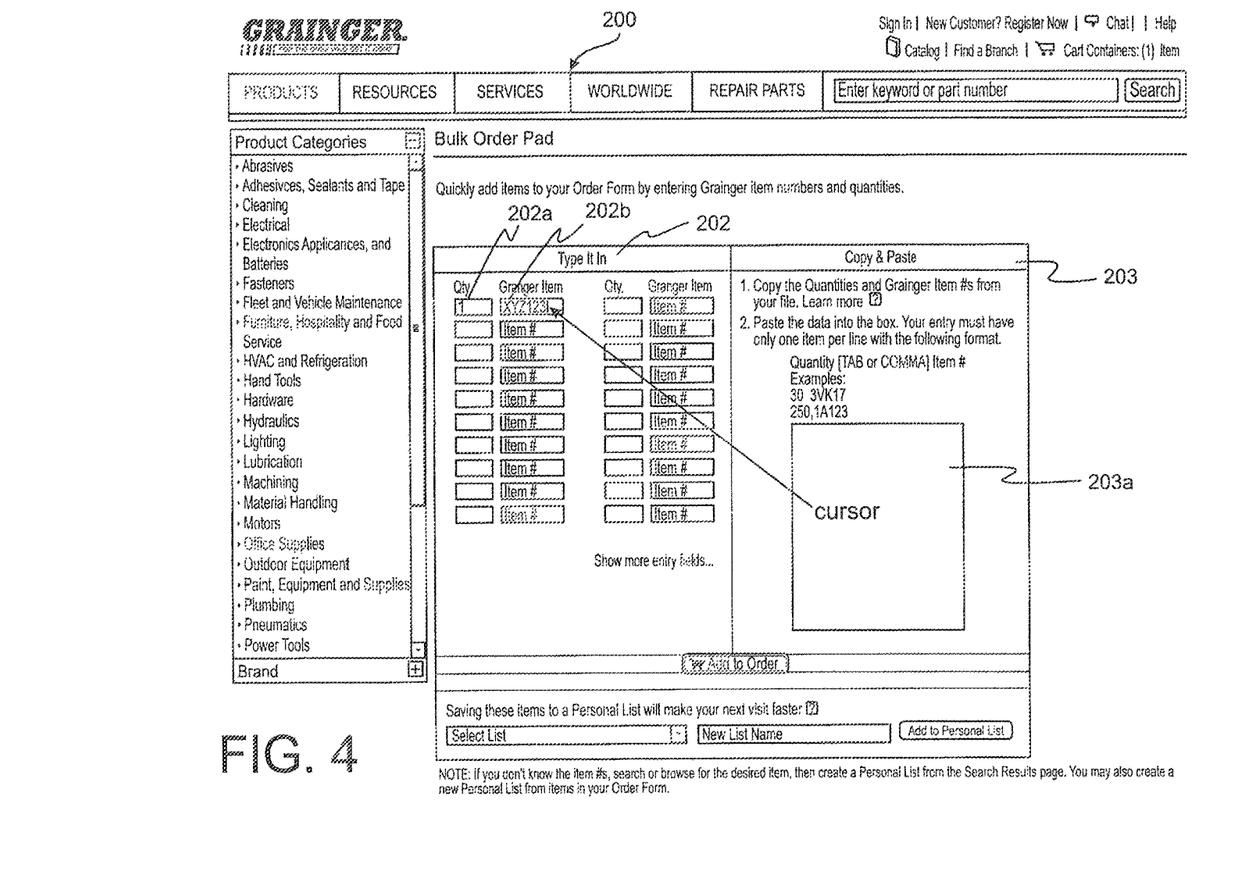
FIG. 4 illustrates another example page that provides an access point in which a customer can enter a manufacturer, competitor, or other non-vendor specific ordering number into an ordering system.
Figure 5:
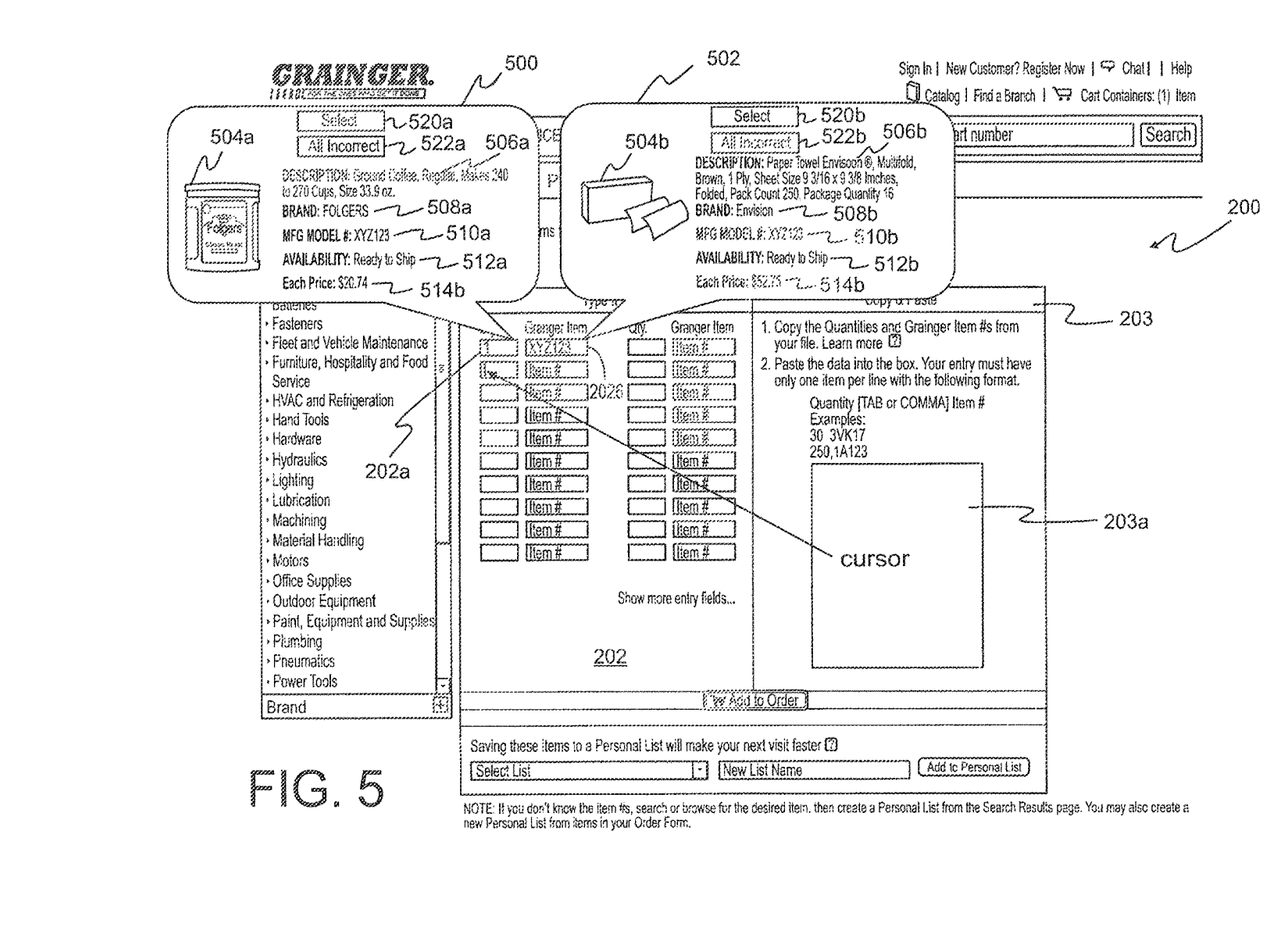
FIG. 5 illustrates the example page of FIG. 4 showing the results of data look-up to cross reference the provided ordering number against a product database of the ordering system.

As with the previous example, each of the example windows 500, 502 provides the customer with identifying information to assist the customer in identifying the desired item cross referenced against the vendor item numbers. For instance, in each of the example windows 500, 502, the customer is provided with an image 504a, 504b, a description 506a, 506b, a brand identifier 508a, 508b, a manufacturer item number 510a, 510b, an availability indicator 512a, 512b, and a unit price 514a, 514b.

Similar to the display of a single product as in FIGS. 2 and 3, in this example, to allow the customer to select and/or otherwise confirm or identify the intended product, each of the example windows 500, 502 includes a confirmation button 520a, 520b (e.g., "Select") to select the specific product identified in the corresponding window 500, 502, and a cancel button 522a, 522b (e.g., "All Incorrect") to identify that none of the displayed products are the intended item. As will the other examples disclosed herein, by choosing any of the confirmation buttons 520a, 520b, the customer can indicate that the corresponding item is the correct intended item, and that the system 68 can replace the inputted item number with the correctly retrieved corresponding vendor item number in the access point 202b. Adversely, by choosing either of the cancel buttons 522a, 522b, the customer can conveniently indicate that all of the retrieved and displayed products are incorrect, and as previously described, allow the customer to edit and/or otherwise research the correct item number. Once all the items have been successfully cross referenced, processing of the order may be undertaken utilizing any suitable purchasing process such as, for example, a shopping cart order processing model.

Figure 6:
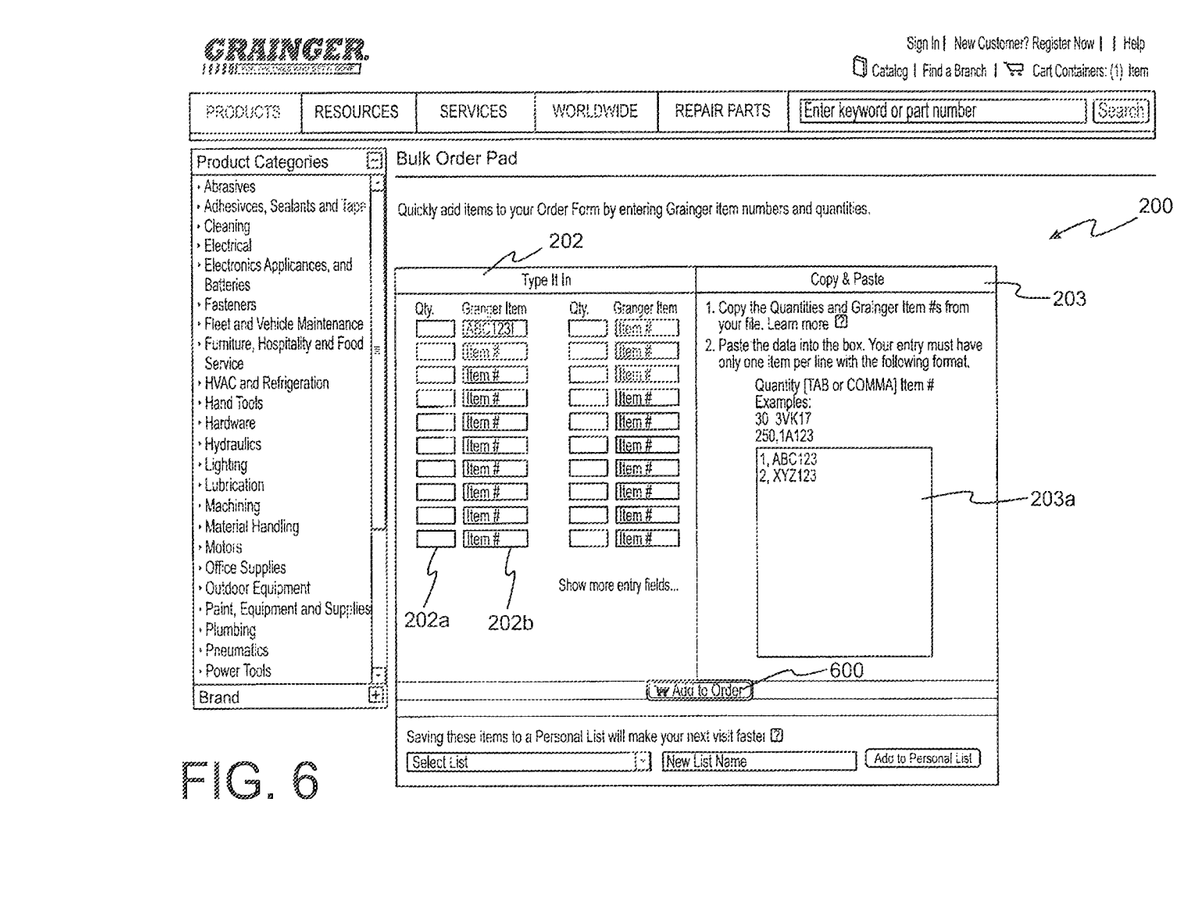
FIG. 6 illustrates another example page that provides an access point in which a customer can enter multiple manufacturer, competitor, or other non-vendor specific ordering numbers into an ordering system.
Figure 7:
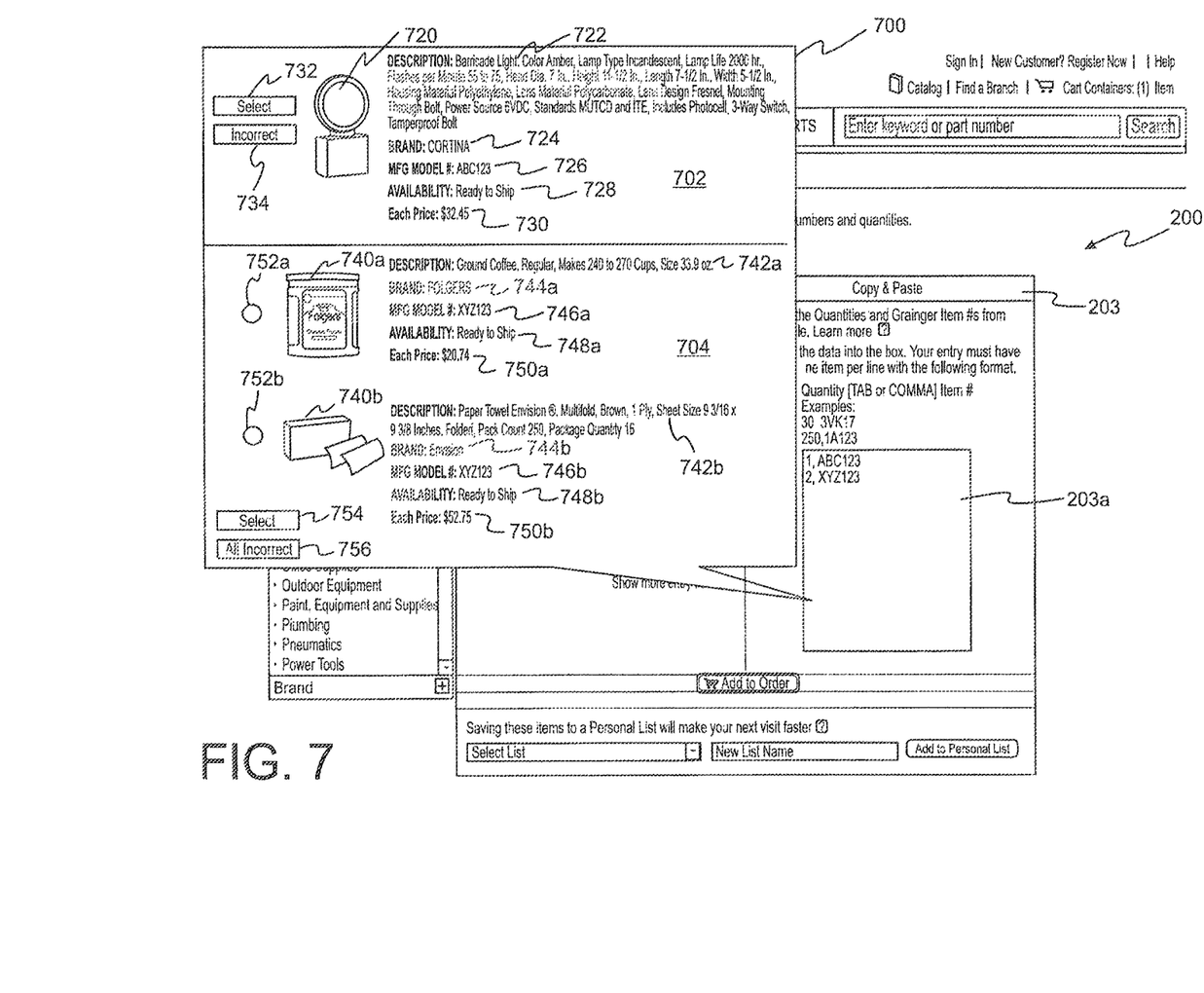
FIG. 7 illustrates the example page of FIG. 6 showing the results of data look-up to cross reference the provided ordering numbers against a product database of the ordering system.

Likewise, in the illustrated example of FIGS. 6-7, a customer may enter a bulk order in the corresponding access point 203 to initiate a purchase process of one or many items. It will be appreciated that the bulk order process may be any suitable list and/or data entry format to allow the customer to conveniently enter one or more orders into the order process such as a "Quantity [TAB or COMMA] Item #" format. In this example, the access point 203a permits a customer to enter the quantity and item number of two desired products as "1, ABC123" and "2, XYZ123". Due to the nature of allowing multiple inputs into the access point 203a, the example access point will typically not trigger a cross reference look-up until the entirety of the list is entered, and focus is removed from the access pint 203a via any suitable means, including for instance, selection of another user interface such as an "Add to Order" selection button 600. It will be understood, however, that the triggering event for a cross reference look-up may be any suitable triggering event including, real-time, near real-time, predetermined time delay, etc.

In this example, once triggered, the system host server 68 causes a look-up of each of the entered item numbers in the data repository 68A against any suitable date repository field, and returns information regarding any items that require authentication and/or confirmation from the customer. In the illustrated example of FIG. 7, the server 68 returns cross referenced (e.g., matched and/or closely related items) for both of the entered item numbers in a results window 700.

As with the previous examples, in this instance, the system 68 causes the window 700 to display the returned results to the customer in a dialog box, such as for example a single separate pop-up window including information corresponding to each of the returned items. In particular, as illustrated, the window 700 includes a first portion 702, and a second portion 704. The first portion 702 provides the customer with identifying information to assist the customer in identifying the first of the items for which a cross referenced item was found, while the second portion 704 provides the customer with identifying information to assist the customer in identifying the second of the items for which a cross referenced item was found. It will be appreciated that the number of displayed portions and/or items may vary according to the number of items requiring confirmation and/or the number of possible matched items returned. In this instance, the display may be scrollable, selectable, navigable, etc. as desired.

As with the previously described examples, in the example window portion 702, the customer is again provided with information to assist in identifying the desired product purchase including, for example, an image 720, a description 722, a brand identifier 724, a manufacturer item number 726, an availability indicator 728, and a unit price 730. Additionally, to allow the customer to select and/or otherwise confirm or identify the intended product, the example window portion 702 includes a selectable confirmation button 732 (e.g., "Select") and a cancel button 734 (e.g., "Incorrect").

Similarly, to allow the customer to select and/or otherwise confirm or identify the intended product associated with multiple product returns, the example window portion 704 includes multiple products having identifying information including an image 740a, 740b, a description 742a, 742b, a brand identifier 744a, 744b, a manufacturer item number 746a, 746b, an availability indicator 748a, 748b, and a unit price 750a, 750b. Additionally to allow the customer to quickly select the desired product, the example window portion 704 identifies each of the returned products by a radio button 752a, 752b. If one of the radio buttons is selected, a confirmation button 754 (e.g., "Select") may be activated to select the specific product identified by the identified radio button. Alternatively a cancel button 756 (e.g., "All Incorrect") may be utilized to identify that none of the displayed products within the relevant window portion are the intended item.

Figure 8:
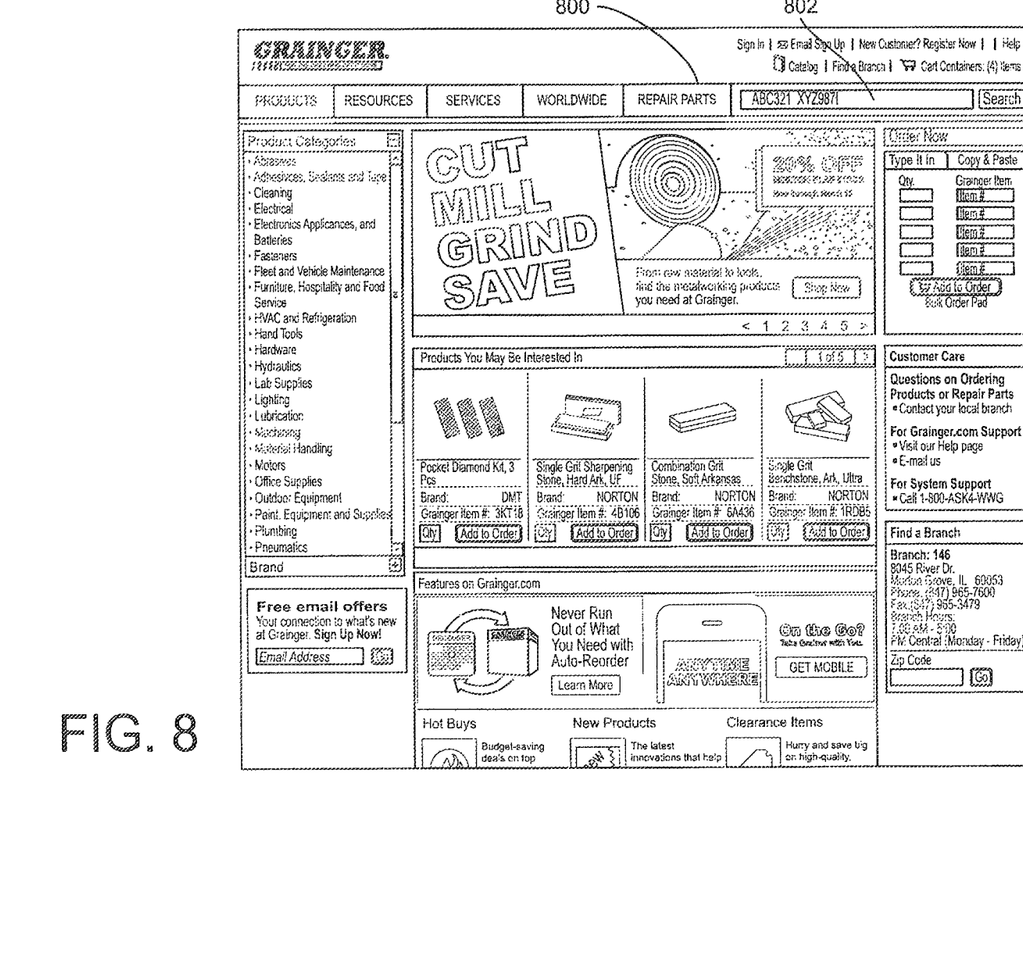
FIG. 8 illustrates another example page that provides an access point in which a customer can enter multiple manufacturer, competitor, or other non-vendor specific item numbers into an ordering system.
Figure 9:
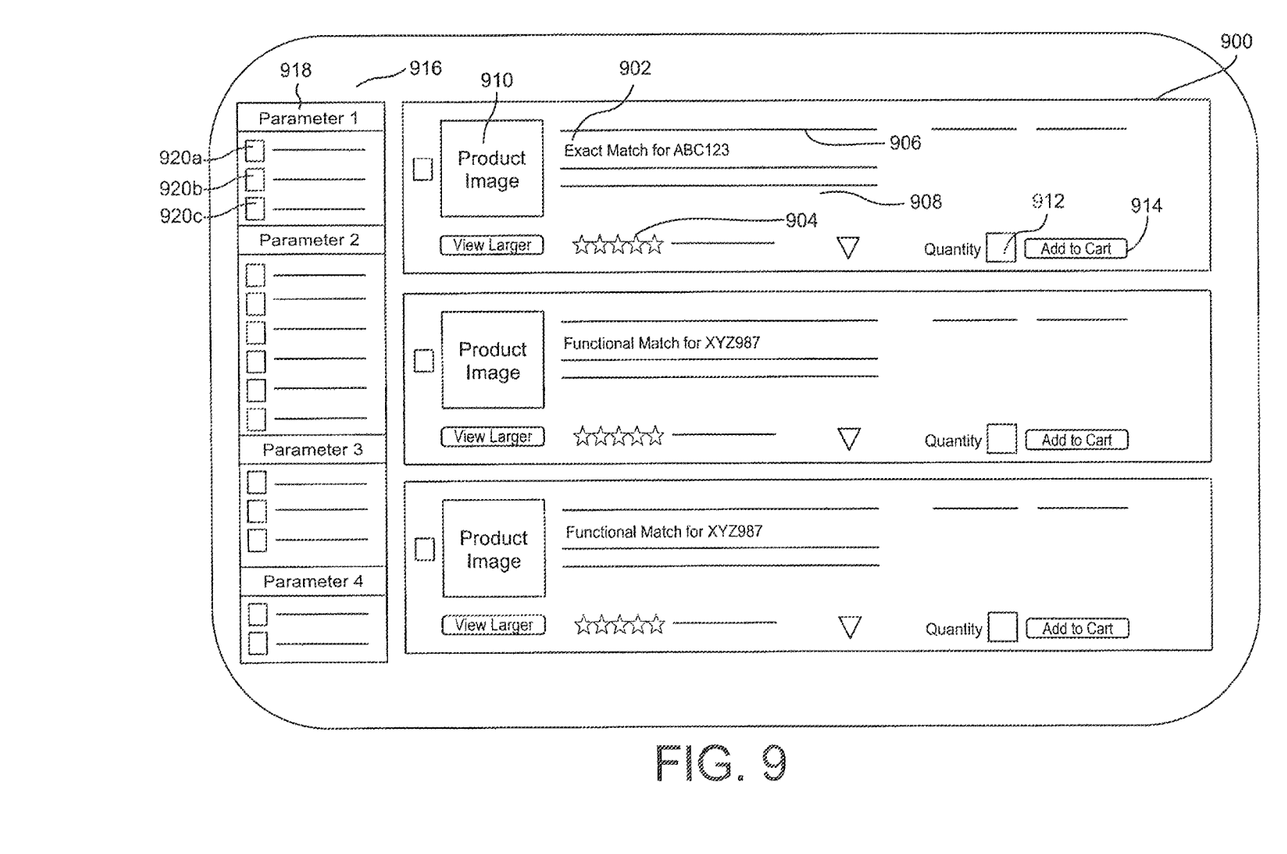
FIG. 9 illustrates the example page of FIG. 8 showing the results of data look-up to cross reference the provided multiple item numbers against a product database of the ordering system in a list-style format.
Figure 10:
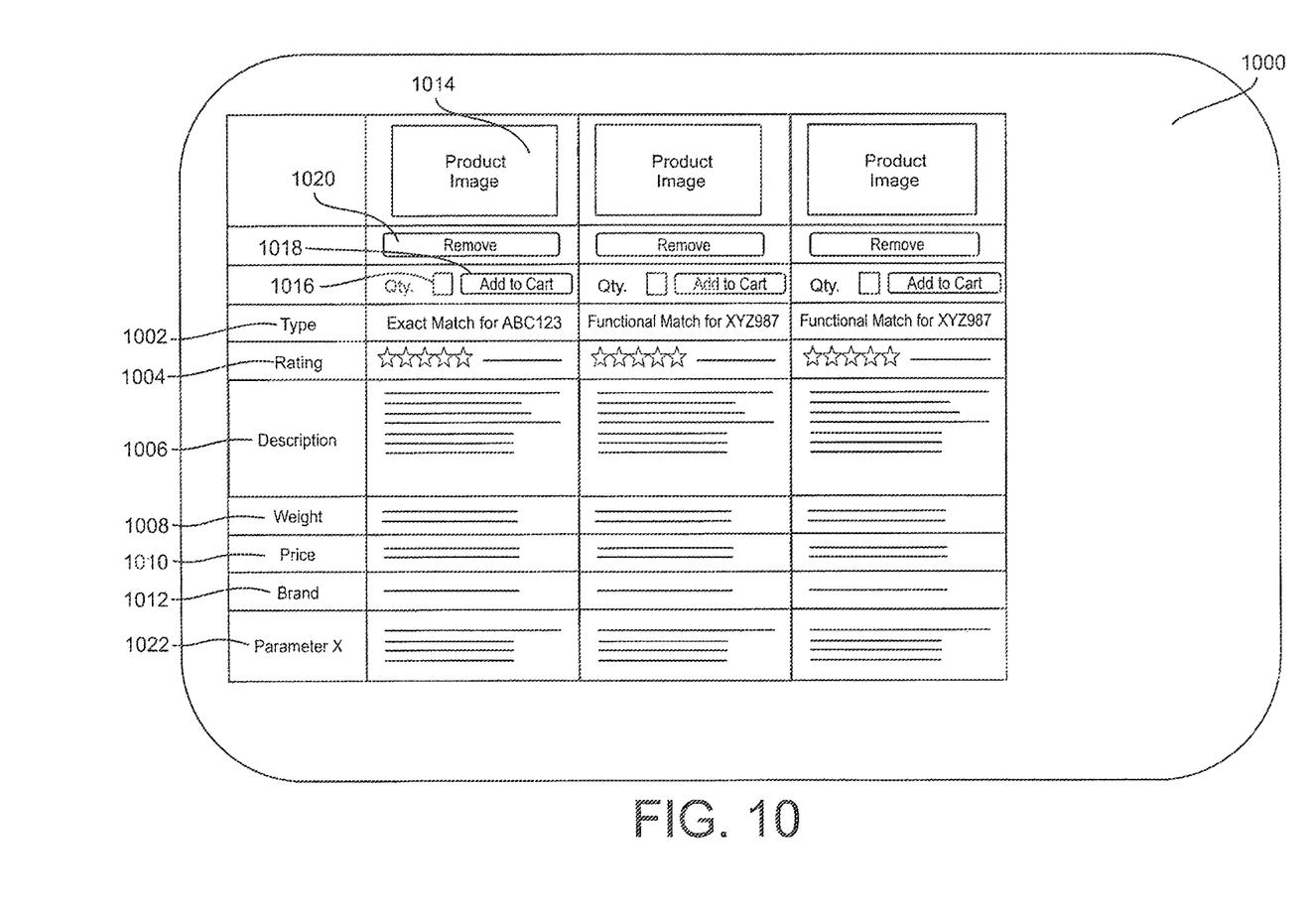
FIG. 10 illustrates the example page of FIG. 8 showing the results of data look-up to cross reference the provided multiple item numbers against a product database of the ordering system in a direct product comparison matrix format.

In the illustrated examples of FIGS. 8-10, a customer can enter multiple vendor and/or secondary ordering numbers (e.g., item numbers) into an access point 800 that comprises a single input text box 802 that allows for a single bulk entry of parseable text, to conveniently purchase, look-up, search for, or otherwise inquire about goods from the vendor. It will be appreciated that the form, location, etc., of the access point 800 may be displayed and/or vary as desired by design, and/or by display type (e.g., mobile device, personal computer, tablet, etc.). Still further, the type and/or manner of inputting the order information may be any suitable entry method including text, voice, picture, scanner, motion, etc.

In the present example, a customer enters any suitable item numbers known to the customer in the corresponding access point 800 to initiate a purchase process. For instance, referring to the example of FIG. 8, there is illustrated an example of a customer entering item numbers "ABC321" and "XYZ987" into the access point 800. By entering the item numbers into the access point 800, the system host server 68 causes a look-up of the item numbers in the data repository 68A. It will be appreciated that the triggering event to perform the look-up of the item numbers in the data repository 68A may be caused by any suitable action, including for example, a change in the user interface focus, an activation of the access point by being clicked on, moused over, touched, and/or otherwise selected, a time delay, a real-time look-up, near real-time look-up, and/or any other suitable event trigger.

Upon the server 68 performing an item numbers look-up in the data repository 68A, and upon the server 68 cross referencing the item numbers to vendor item numbers stored in the data repository 68A (if necessary), the server 68 may return the matched (i.e., exact match) and/or closely related (i.e., functional match) search results, collectively, the returned product matches, to a list window 900 having a list style format, as shown in FIG. 9.

The list style format permits a customer to view various groups of product attributes of the exact and/or functional matches for the input item numbers regardless of whether the corresponding returned product matches for the item numbers belong to the same product category. Such example product attributes include product match type 902, a product rating 904, a product name 906, product description 908, a product weight, a product price, etc. The list style format may also contain a product image 910, a quantity text entry box 912, in which the customer inputs the quantity of a particular item that he or she would like to purchase, and/or an "add to cart" button 914 or similar button that the customer can select to add the requested quantity of one or more items to the customer's virtual shopping cart for eventual purchase. One of ordinary skill in the art will appreciate that not all of these product attributes or features need be present in the list style format to be within the scope of the present disclosure and that additional product attributes may be included in the list style format without departing from the spirit of the present disclosure.

Still further, if insufficient information regarding a non-vendor product is stored within the data repository 68A, additional information regarding the item in question may alternatively be retrieved from the electronic catalog and/or database of a third party, and/or through any available search engine by any suitable retrieval method. For example, the third party data may be retrieved as disclosed by the systems and methods in U.S. Pat. No. 7,546,289, herein incorporated by reference in its entirety.

In this example, the list style format also includes a product attribute search window 916. The product attribute search window 916 permits the customer to view only those exact and/or functional matches (i.e., returned product matches) in the list that have certain product attributes selected by the customer. For example, a first parameter 918 might correspond to product price. The first parameter 918 may have several constituent parameter options, denoted 920a, 920b, and 920c corresponding to different prices or price ranges. The customer can select the prices or price ranges of products that he or she would like to display in the list window 900 by clicking, mousing over, or otherwise triggering the selection of the one or more parameter options from the product attribute search window 916. In this way, the customer can limit which exact and/or functional matches are displayed in the list window 900. One of ordinary skill in the art will appreciate that the product attribute search window 916 may contain multiple parameters (as shown in FIG. 9) in addition to or instead of product price, including, for example, product type, product color, product weight, etc.

Alternatively, upon the server 68 performing a item numbers look-up in the data repository 68A, the server 68 may return all matched and/or closely related search results to a direct product comparison matrix window 1000 comprising a direct product comparison matrix, as shown in FIG. 10. The direct product comparison matrix window 1000 may present the matched (i.e., exact match) and/or closely related (i.e., functional match) search results, collectively the returned product matches, for the input item numbers, namely, in this example, "ABC123" and "XYZ987."

The format of the direct product comparison matrix window 1000 permits a customer to easily compare various groups of product attributes of the exact and/or functional matches (i.e., returned product matches) for the input item numbers, including, for example, product match type 1002, a product rating 1004, a product description 1006, a product weight 1008, a product price 1010, a product brand name 1012, etc. The direct product comparison matrix window 1000 may also contain a product image 1014, a quantity text entry box 1016, in which the customer inputs the quantity of a particular item that he or she would like to purchase, and/or an "add to cart" button 1018 or similar button that the customer can select to add the requested quantity of one or more items to the customer's virtual shopping cart for eventual purchase. One of ordinary skill in the art will appreciate that not all of the aforementioned parameters or features need be present in the direct product comparison matrix window 1000 to be within the scope of the present disclosure and that an additional parameter 1022, or parameters may be included in the direct product comparison matrix without departing from the spirit of the present disclosure.

At times, the direct product comparison matrix window 1000 may display one or more products that the customer does not desire to view and/or purchase. In such cases, the customer may wish to remove such one or more products from the direct product comparison matrix window 1000. Thus, in some examples, including the example shown in FIG. 10, the direct product comparison matrix window 1000 contains a "remove" button 1020 or similar button that the customer can select (via any suitable selection mechanism, e.g., mouse click, mouse over, etc.) to remove a product from the direct product comparison matrix window 1000. Alternatively, if the direct product comparison matrix window 1000 displays one or more products that the customer does not desire to view and/or purchase, the customer may also utilize an "undo," "revise," or similar feature that permits the customer to select alternative or additional products for display in the direct product comparison matrix window 1000 that the customer would like to view and/or purchase.

Figure 11:
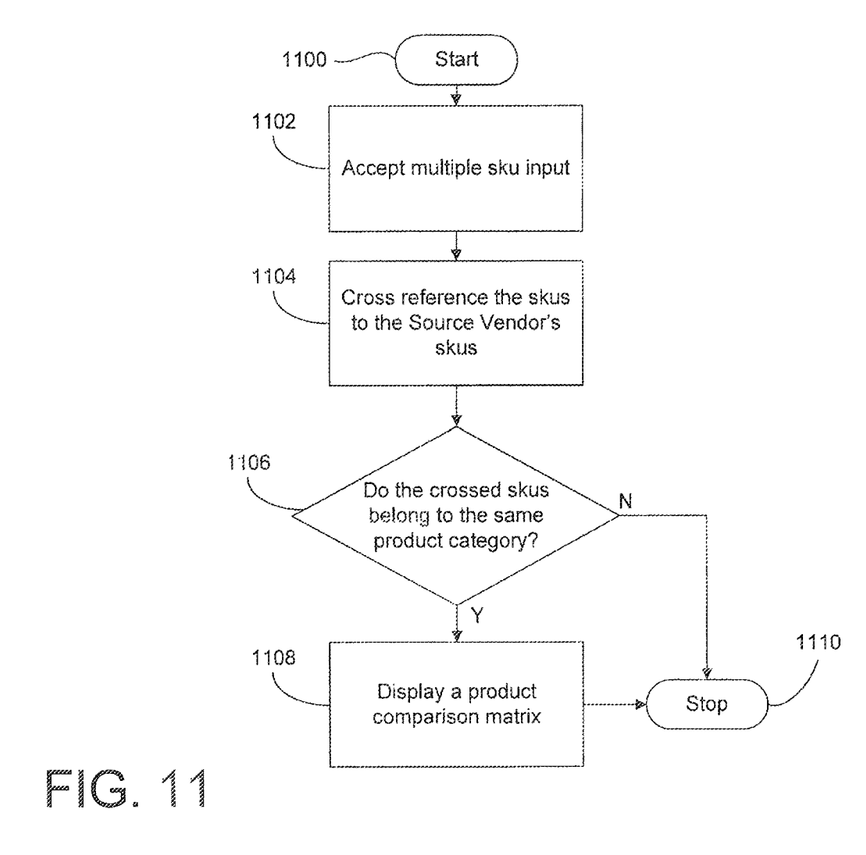
FIG. 11 illustrates in logic flow chart format the process of accepting multiple item numbers into an ordering system to displaying a direct product comparison matrix of the products corresponding to the multiple item numbers, as shown in FIG. 10.

In the examples shown in FIGS. 8-10, the server 68 will cause the client computing device to display a direct product comparison matrix according to the process set forth in the logical flow chart shown in FIG. 11. In this example, at the start block 1100, the server 68 is prepared for the customer to input multiple item numbers. Next, the customer inputs multiple item numbers at block 1102. To the extent the item numbers are not vendor item numbers, the server 68 cross references the item numbers to vendor item numbers stored in the data repository 68A at block 1104, or through any suitable third party search routine as noted above. The server 68 then determines whether the exact and/or functional matches belong to the same product category at block 1106. If the exact and/or functional matches belong to the same product category, then the server 68 causes such exact and/or functional matches to be displayed in a direct product comparison matrix window, as disclosed in the example of FIG. 10, at block 1108. Otherwise, the server 68 causes such exact and/or functional matches to be displayed in another suitable format, for example, the list style format of FIG. 9. The process to determine whether the server 68 will cause to be displayed a direct product comparison matrix is complete at block 1110.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A non-transient, computer readable media having stored thereon instructions for providing access to an automated cross referencing functionality related to a customer order within an electronic vendor system having an associated data repository in which is stored a listing of a plurality of products that are available for purchase, wherein each of the plurality of products is directly associated with a corresponding one of a plurality of vendor item numbers and wherein each of the plurality of products is associated with at least a corresponding one of a plurality of secondary item numbers or a corresponding one of a plurality of item descriptions, the instructions performing steps comprising:

causing a client computing device to display a page, the page comprising a graphical user interface having an order access point user interface element in which an order number corresponding to a desired item is enterable;

in response to an entering of the order number in the order access point user interface element of the graphical user interface, receiving from the client computing device a first command to query the data repository using the entered order number;

responding to the received first command by performing a query which uses the entered order number to identify one or more of the plurality of products within the data repository by finding which one or more of the associated plurality of secondary item numbers or which one or more of the associated plurality of item descriptions contain the entered order number whereby the identified one or more of the plurality of products are a subset of relevant products associated with the entered order number;

causing the client computing device to display in the graphical user interface a plurality of user interface elements, each corresponding to a one of the subset of relevant products; and in response to a selection signal being received as a result of a user interaction with a one of the user interface elements from the presented plurality of user interface elements of the graphical user interface causing the client computing device to replace the entered order number in the order access point user interface element of the graphical user interface with a one of the plurality of vendor item numbers associated with the one of the subset of relevant products corresponding to the selection signal.

2. The computer-readable media as recited in claim 1, wherein the order access point user interface element of the graphical user interface is a text box.

3. The computer-readable media as recited in claim 2, wherein the text box is a parseable text box adapted to allow for input of a plurality of order numbers.

4. The computer-readable media as recited in claim 1, wherein entering the order number comprises at least one of text input, voice response, barcode reading, or scanning.

5. The computer-readable media as recited in claim 1, wherein the selection signal is caused to be generated in response to an interaction with the one of the user interface elements of the graphical user interface via use of an input device selection, a client computing device tap, a client computing device movement, or a client computing device touch.

6. The computer-readable media as recited in claim 1, wherein the subset of relevant products associated with the entered order number includes information representative of each of the products.

7. The computer-readable media as recited in claim 6, wherein the information includes at least one of an image, a description, a brand identifier, a manufacturer item number, an availability indicator, or a unit price.

8. The computer-readable media as recited in claim 1, wherein each of the user interface elements of the graphical user interface comprises a link selectable to invoke a further user interface input element of the graphical user interface to provide additional information regarding the relevant product corresponding to the user interface element of the graphical user interface.

9. The computer-readable media as recited in claim 8, wherein the additional information is a catalog page from a catalog on which resides the relevant product.

10. The computer-readable media as recited in claim 8, wherein selection of the link causes the vendor system to redirect to a further page.

11. The computer-readable media as recited in claim 10, wherein the further page is located within the vendor system.

12. The computer-readable media as recited in claim 10, wherein the further page is located within a system of a third party.

13. The computer-readable media as recited in claim 1, wherein the user interface elements of the graphical user interface are presented in a pop-up window within the client computing device.

14. The computer-readable media as recited in claim 1, wherein the user interface elements of the graphical user interface are presented in a portion of the displayed page.

15. The computer-readable media as recited in claim 1, wherein causing the vendor system to query the data repository to cross reference the entered order number with the vendor item number is triggered in a substantially real-time basis.

* * * * *